No. 667,267. Patented Feb. 5, 1901.
T. P. WALTER.
VALVE.
(Application filed Apr. 27, 1897. Renewed June 7, 1900.)
(No Model.)
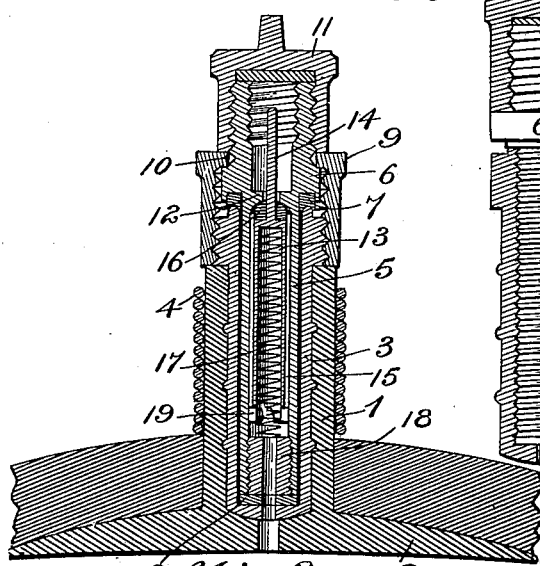
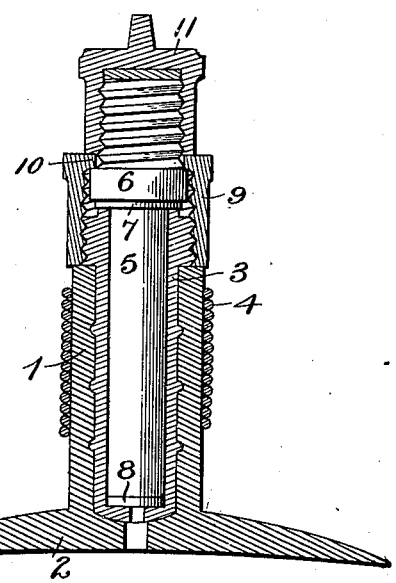
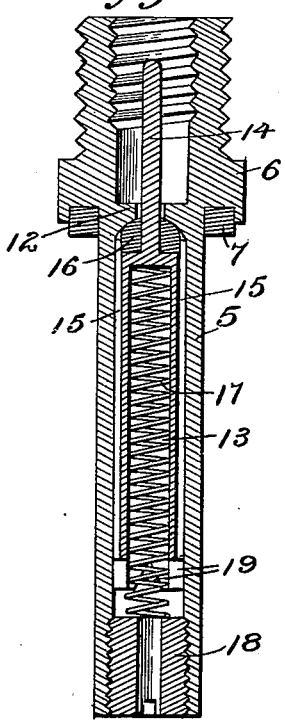
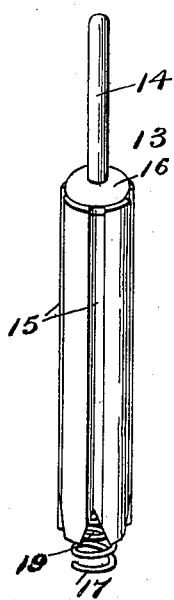
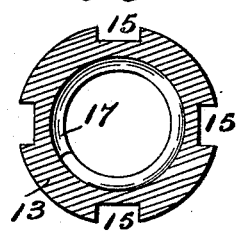
Inventor
Theophiel P. Walter.
Witnesses
Edwin G. McKee
By his Attorneys,

UNITED STATES PATENT OFFICE.

THEOPHIEL PAUL WALTER, OF BEATRICE, NEBRASKA, ASSIGNOR OF ONE-HALF TO ALBERTUS H. KIDD, OF SAME PLACE.

VALVE.

SPECIFICATION forming part of Letters Patent No. 667,267, dated February 5, 1901.

Application filed April 27, 1897. Renewed June 7, 1900. Serial No. 19,486. (No model.)

*To all whom it may concern:*

Be it known that I, THEOPHIEL PAUL WALTER, a citizen of the United States, residing at Beatrice, in the county of Gage and State of Nebraska, have invented a new and useful Valve, of which the following is a specification.

This invention relates to valves, and especially to that class of valves employed in connection with pneumatic tires for inflating and deflating the same.

Valves used in connection with pneumatic tires are generally of one or two classes, either what is termed as "cot-valve," in which a metal tube is employed for carrying or containing the valve and constituting a part of the valve shell or casing and which is inserted into the rubber cot or valve tube projecting from the tire and clamped therein by a binding-wire wrapped around the cot and confining it upon or about the metal tube, or a "shoe-valve," in which a like tube has an end flange which passes into the tire itself and an outer nut screwed on the metal tube to clamp the tire between the nut and flange. In both types of valve the metal tube is known as the "tire-tube" and constitutes one member of the valve-shell, to which the other member may be connected, so that the valve proper may play between the two members. In the present invention the tire-tube is employed as a mere carrier or housing for the valve-shell and valve proper, a valve complete in itself and comprising a valve shell or casing, valve proper, valve-stem, and valve-actuating means being coupled to the tire-tube in such manner that by a simple operation the said valve in its entirety may be removed from the tire-tube for repair, &c.

While the present invention accomplishes the advantages above enumerated, the construction of the valve as a whole is simple, inexpensive, and durable, and the parts are readily accessible, so that any one may quickly disassociate the several parts of the valve, clean or repair the same, and reassemble the parts without touching the rubber cot or disconnecting the tire-tube therefrom.

Other objects and advantages of the invention will appear in the course of the ensuing description.

The invention consists in a valve embodying certain novel features and details of construction and arrangement of parts, as hereinafter fully described, illustrated in the drawings, and incorporated in the claims.

In the accompanying drawings, Figure 1 is a longitudinal section taken through a valve-tube and tire-tube, showing a valve constructed in accordance with this invention and held therein. Fig. 2 is a longitudinal section through the tire-tube and union, the valve shell or casing being shown in elevation. Fig. 3 is an enlarged longitudinal section through the valve shell or casing. Fig. 4 is an enlarged perspective view of the valve detached. Fig. 5 is an enlarged cross-sectional view through the valve. Fig. 6 is a longitudinal section through the tire-tube with the containing-valve shell in elevation, showing a modification in the manner of associating said parts.

In the drawings, 1 designates the valve-tube of a pneumatic tire, which is provided with an enlarged base or head 2, adapted to be vulcanized or otherwise connected to the tire itself, and 3 indicates the tire-tube, having one end open and its other end closed, with the exception of a central hole or perforation, forming an egress-duct, adapting it to communicate with the interior of the tire through an opening at the center of the head or base 2 of the valve-tube. The tire-tube 3 is provided on its outer surface with a series of ribs or ridges to permit it to be securely held within the valve tube or cot 1 by means of a binding-wire 4, wrapped around the valve-tube in the ordinary way.

5 indicates the valve shell or casing, also made in tubular form and having an exteriorly-smooth cylindrical inner end adapted to be slidingly inserted in the hollow socket of the tire-tube through the open upper end thereof, the shell 5 being formed exteriorly of or beyond the end of the tire-tube with an enlarged outer end and having a projecting shoulder or flange 6, extending around it, the under side of which shoulder is recessed or provided with an annular groove to receive a packing-washer 7, of rubber, leather, or other suitable material, adapted to fit against the outer edge of the tire-tube, as clearly shown in the drawings, so as to form an air-tight joint between the parts at this point. For a similar purpose an annular washer 8 will by preference be arranged in the bottom of the socket of the tire-tube in position to be engaged by the lower end of the valve shell or casing when the latter is inserted in the tire-tube, as shown in Fig. 2.

9 indicates a union or coupling sleeve for holding the valve-casing and tire-tube together, said sleeve having an inturned flange 10 formed around it at or near its outer end and adapted to engage over the projecting flange 6 of the valve-shell, the lower part of said sleeve being internally screw-threaded to engage exterior threads on the upper part of the tire-tube, as clearly shown in the drawings.

In Fig. 6 I have shown the tire-tube 5 interiorly threaded, as at 20, and a valve-shell exteriorly threaded and screwed therein. By such arrangement the coupling-sleeve 9 may be dispensed with and a simpler and cheaper connection between the tire-tube and valve shell or casing provided.

The upper end of the valve-shell 5 is exteriorly screw-threaded to receive a cap 11, by means of which the outer end is closed, and when said cap is removed the interiorly-threaded portion of the casing which projects beyond the union 9 is adapted to receive a pump connection for inflating the tire. The valve shell or casing is provided with a passage extending through it from end to end, and a diaphragm or partition 12 extends across said passage, forming a contracted neck, and provided with a central opening or perforation forming an ingress-duct, a valve 13 being arranged within said passage, which constitutes the valve-chamber. The construction of the valve is clearly illustrated in Fig. 4 and is adapted to control the passage of air through the valve-shell into the tire. The valve 13 has a stem 14, which is arranged to play in the central opening in the partition or neck 12 and has its upper end arranged adjacent to the mouth of the casing 5, so that it may be conveniently pressed inward to unseat the valve in case the latter should have a tendency to stick. The body portion of the valve is tubular and is provided upon the outer side with air grooves or channels 15, extending longitudinally thereof. The valve-stem 14 is connected with a tubular body portion by means of a head or crown extending across the body slightly within the outer edge of the same, whereby an annular seat or recess is formed in the upper end of the body, in which is adapted to be held a washer or valve proper, 16, of rubber or the like, adapted to engage a valve-seat formed by the under side of the partition 12 in the valve-shell. The inner end of the valve is left open to receive a valve-seating spring 17, the upper end of which is engaged by the head or crown by which the stem or valve is secured to the body and the inner end of which is adapted to rest against a tubular plug 18, screwed into the lower end of the casing, with which plug the inner end of the tubular body of the valve is adapted to engage, for which reason said inner end of the body is provided with notches to permit the passage of the air into the tire when the valve is unseated.

By the arrangements described it will be seen that when it is desired to remove the valve from the tire for the purpose of repairing or cleaning the same it is not necessary to remove the tire-tube from the valve-tube of the tire, as is the case with the ordinary construction; but it is only necessary to unscrew the union 9, after which the valve may be readily removed from the air-tube as one part. When the repairing or cleaning has been done, the parts may be readily associated, and it will be seen that the spring is such as to permit a tight joint to be made between the parts no matter how many times they may be detached from each other. Furthermore, the construction of the valve itself is very simple and inexpensive, since, as will be evident, the spring is housed within the tubular body of the valve and is thus prevented from becoming compressed or set, so as to render the valve inoperative.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what I claim as new, and desire to secure by Letters Patent, is—

1. In tire-valves, a valve shell or casing having an internal seat and valve-chamber, and a valve proper inclosed within said casing, said casing having an outer wall surrounding said chamber and adapted to fit the interior of a tire-tube and having an annular groove surrounding said wall, an annular flange beyond said groove for projecting across the end of said tire-tube, a ring of packing material in said groove, and a union engaging said flange for coupling said casing to the tire-tube and compressing the packing material between said flange and the end of the tire-tube.

2. In tire-valves, a valve shell or casing having an ingress-duct, a valve-seat, and a valve-chamber within its interior, and a valve proper in the said chamber, said casing having an outer wall surrounding said chamber for fitting within the socket of the tire-tube and having a projecting flange beyond said wall for projecting across the end of such tire-tube, and having a recess in such flange, a packing-ring in said recess, and a coupling surrounding said flange for separably coupling said casing to the tire-tube.

3. The combination with a tire-tube, and a union, of a removable valve shell or casing having an interior valve-seat within a protruding end thereof, an externally-channeled hollow valve loosely fitted in the valve-casing, and having a stem which passes through the valve-seat and into the protruding end of the valve-casing, a hollow plug carried by the inner end of the valve-casing, a spring arranged within the hollow valve and seated against the plug, and a cap to be attached to the protruding end of the valve-casing, substantially as and for the purpose described.

4. A valve shell or casing provided at an intermediate point of its length with a valve-seat, a hollow plug carried by the inner end of the valve-casing, an externally-grooved elongated hollow valve loosely fitted in the valve-casing and provided with a stem which passes through the valve-seat and into the outer end of the valve-casing, and a coiled spring housed within the hollow valve to bear at one end against the same, and at its other end against the plug, combined with a tire-tube communicating at its inner end with the tire and having the valve-casing removably fitted therein to protrude from the open end of the tire-tube, and a union connected to the tire-tube and to the valve-casing at a point within the protruding end of the latter, substantially as and for the purpose described.

5. The combination with a valve shell or casing provided with a valve-seat, and a hollow plug carried by the inner end of said casing, of an externally-grooved hollow elongated valve slidably fitted in said casing and provided at its open end with notches which open into the grooves, and a coiled spring housed within the hollow valve and seated against the hollow plug, substantially as described.

6. The combination with a valve-tube, and a tire-tube secured therein, of a valve shell or casing provided with an internal valve-seat and with a hollow plug and fitted removably within said body and also having an annular flange and a threaded end exposed beyond the tire-tube, a union screwed on the tire-tube and flanged to embrace the flange of the valve-casing within the threaded exposed end of the latter, a hollow grooved valve slidably fitted in the valve-casing and having a stem, a coiled spring housed within the hollow valve, and seated against the plug within the valve-casing, and a cap having a screw-threaded engagement with the protruding end of the valve-casing, substantially as described.

7. The combination with a tire-tube, of a valve shell or casing carrying an interiorly-arranged valve, valve-stem, and valve-actuating means which are located within the shell or casing, the latter having a close sliding fit within the tire-tube, and inserted and removed as one part therefrom without disturbing the valve, its stem or actuating means and provided on its exterior at an intermediate point with a flange, and a union engaging the flange and the tire-tube to couple the valve shell or casing in place.

8. The combination with a tire-tube, of a valve shell or casing carrying an interiorly-arranged valve, valve-stem, and valve-actuating means which are located within the shell or casing, the latter having a smooth cylindrical inner end slidingly inserted within and removable as one part from the tire-tube, an enlarged portion arranged exteriorly of the tire-tube, and a union engaging said enlarged portion and coupling the valve-casing to the tire-tube.

9. In tire and other valves, the combination with a metal tube adapted to be fixed to a tire and having a long cylindrical smooth socket at its outer end and an apertured end affording communication between said socket and the tire, of a valve member constituting a complete valve, and comprising a shell with an internal ingress-duct, valve-seat, valve-chamber, an egress-duct, and having an external long smooth wall closely fitting the socket in said tube, a valve proper, its actuating means and its stem inclosed within and carried by said shell, the stem of the valve projecting through and beyond the internal ingress-duct, a packing between said valve member and said tube, and means separably coupling the valve member with said tube.

10. In tire and other valves, a metal tube adapted to be fixed to a tire and having at its outer end a smooth open end socket for communicating with the interior of the tire, in combination with a valve member consisting of a valve-casing having an ingress-duct, an internal seat, and a valve-chamber within its interior, a valve proper, its stem and actuating means inclosed within said chamber, the stem of the valve projecting through and beyond the ingress-duct, said member having a long smooth inner end fitting entirely within said tube with a sliding fit until its valve-chamber and seat are inwardly of the outer end of the tube and having a flange at the outer end of said member, a packing between the flange of said member and the outer end of said tube, and means separably coupling said member to the tube, whereby the portion of said member opposite said valve proper is inclosed within and protected by said tube.

11. In tire and other valves, the combination with a tire-tube, of a valve member adapted to be coupled to said tube and consisting of a valve-shell having an ingress-duct, a valve-seat, a valve-chamber, and an egress-duct inclosed within its interior, and having a cylindrical smooth outer wall surrounding said chamber and adapted to fit with a close sliding fit within the tire-tube, an integral outer screw-threaded end for receiving a pump connection and arranged exteriorly of the tire-tube, an intermediate external shoulder on the valve member contiguous the end of the tire-tube, and a valve proper, its stem and actuating means inclosed within said chamber, the stem projecting through and beyond the ingress-duct into the screw-threaded end of the valve member, and a coupling union for connecting the valve member to the tire-tube.

In testimony that I claim the foregoing as my own I have hereto affixed my signature in the presence of two witnesses.

THEOPHIEL PAUL WALTER.

Witnesses:
    H. J. GILLILAND,
    PEARL KING.